United States Patent

Hwang et al.

[11] 3,953,413
[45] Apr. 27, 1976

[54] SUPPORTED CHROMIUM-CONTAINING CATALYST AND PROCESS OF POLYMERIZING 1-OLEFINS

[75] Inventors: Yu-Tang Hwang; Howard L. Grimmett, both of Clinton, Iowa

[73] Assignee: Chemplex Company, Rolling Meadows, Ill.

[22] Filed: June 13, 1974

[21] Appl. No.: 478,879

[52] U.S. Cl. ............................ 526/350; 252/430; 252/431 R; 526/90; 526/349; 526/96
[51] Int. Cl.² ........................ C08F 4/02; C08F 10/02
[58] Field of Search .............. 252/430, 431 R, 88.2, 252/93.7, 94.9 DA

[56] References Cited

UNITED STATES PATENTS

| | | | |
|---|---|---|---|
| 3,008,943 | 11/1961 | Guyer | 260/94.9 DA |
| 3,311,596 | 3/1967 | Berding et al. | 260/94.9 DA |
| 3,392,162 | 7/1968 | Zigler et al. | 260/94.9 B |
| 3,513,150 | 5/1970 | Matsuura et al. | 260/94.9 DA |
| 3,709,853 | 1/1973 | Karapenka | 260/94.9 DA |
| 3,806,500 | 4/1974 | Karol | 260/94.9 DA |
| 3,844,975 | 10/1974 | Karol | 260/94.9 DA |

FOREIGN PATENTS OR APPLICATIONS 601,919   7/1960   Canada ...................... 260/94.9 DA

OTHER PUBLICATIONS

Holne et al. J. Phys. Chem. 62 1098–1101 (1958).

*Primary Examiner*—Edward J. Smith
*Attorney, Agent, or Firm*—Wegner, Stellman, McCord, Wiles & Wood

[57] ABSTRACT

A catalyst and the method of making same and a method of making polymers of 1-olefins with said catalyst in which the catalyst is prepared by dispersing on a finely divided, difficultly reducible, inorganic support of the nature of silica, alumina, thoria, zirconia, titania, magnesia and mixtures thereof, a chromium chelate derived from a beta-dicarbonyl compound that may be either acyclic or cyclic, the chelate being essentially of the formula

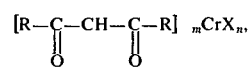

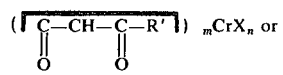

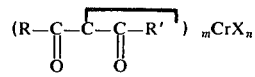

wherein R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, $m$ is a whole number of 1 to 3, $n$ is a whole number of 0 to 2 and $m$ plus $n$ is 2 or 3 and X is an inorganic or organic negative group (relative to chromium) such as halide, alkyl, alkoxy and the like, followed by activating the mixture of the supportt and chromium chelate by heating at an elevated temperature in a non-oxidizing (either inert or reducing) atmosphere. Typical compounds are chromium acetylacetonate, chromium benzoylacetonate, chromium 5,-5-dimethyl-1,3-cyclohexanedionate, chromium 2-acetylcyclohexanonate, and the like.

36 Claims, No Drawings

SUPPORTED CHROMIUM-CONTAINING CATALYST AND PROCESS OF POLYMERIZING 1-OLEFINS

BACKGROUND OF THE INVENTION

This invention pertains to catalysts for polymerizing or copolymerizing olefinic compounds and especially ethylene and other 1-olefins having a total of 2 to 8 carbon atoms and the copolymerization of these with 1-olefins containing from 2 to 20 carbon atoms, to methods of preparing the catalysts and to methods of making these polymers and copolymers.

The most pertinent prior art of which applicants are aware are the following: Z Electrochemie Vol. 63, No. 1 (59), pp. 105–111 which discloses a catalyst formed by the reaction of organoaluminum compounds and transition metal complexes and specifically organoaluminum with the chromium acetylacetonate complex. The olefin polymerization activity of this catalyst, however, is somewhat low. U.S. Pat. Nos. 3,351,623 and 3,635,840 disclose catalysts comprising a mixture of which one ingredient is a vanadium 2,4-diketone chelate rather than the chromium chelate of this invention. The catalyst systems of this prior art and the results achieved are different from the invention here.

DESCRIPTION OF THE PREFERRED EMBODIMENTS

In accordance with this invention, polymerizable olefinic compounds, and especially 1-olefins of 2–8 carbon atoms, are polymerized or copolymerized with $C_2$–$C_{20}$ olefins to form solid polymers and copolymers in the presence of novel catalysts which consist essentially of low-valent chromium surface species, as an active ingredient, dispersed and supported on at least one difficult to reduce inorganic oxide preferably having reasonable surface area. More uniquely, the low-valent chromium species are derived from a chromium chelate of a beta-dicarbonyl compound of which chromium acetylacetonate is a good example by its interaction with the catalyst support and/or thermal decomposition under a substantially oxygen free atmosphere, for example one that is inert such as nitrogen or reducing such as carbon monoxide.

The inorganic oxide may be silica, alumina, zirconia, thoria, magnesia, titania or mixtures and composites thereof resulting from coprecipitation, impregnation, vapor-phase deposition, etc. Surface area of the support may range from a few m²/g to over 700 m²/g but preferably above 150 m²/g. Pore volume is preferably in excess of 0.5 cc/g if surface area is primarily related to micropores. A finely divided non-porous support with relatively high surface area such as "Cab-O-Sil" may also be used with this invention. Activation of the catalyst at elevated temperatures of preferably to about 850°–2000°F. is accomplished either in a fluid bed maintained by the flow of non-oxidizing gas or in a stationary bed under high vacuum, provided optionally with a small leak-in of non-oxidizing gas.

The chromium acetylacetonate may be regarded as a derivative of 2,4-pentanedione. Due to its chelating structure, six coordination sites of the central chromium are effectively occupied. The related chromium compounds suitable for this invention include virtually all chromium derivatives of a beta-diketone, a beta-keto aldehyde or a beta-dialdehyde of the formula

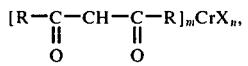

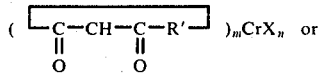

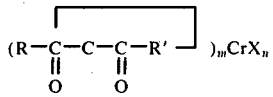

wherein R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, $m$ is a whole number of 1 to 3, $n$ is a whole number of 0 to 2 and $m$ plus $n$ is 2 or 3 and X is an inorganic or organic negative group (relative to chromium) such as halide, alkyl, alkoxy and the like. For example, in addition to chromium acetylacetonate, one may use chromium benzoylacetonate, chromium 5,5-dimethyl-1,3-cyclohexanedionate, chromium 2-acetylcyclohexanonate, and the like.

The chromium in the chelate of this invention is low valent with a valence of three as compared to the valence of six of the prior art chromium oxide-containing catalysts. The new catalysts are dark black if properly activated according to the methods of this invention.

In preparing the catalysts of this invention, the following procedures are involved, some of which are optional as indicated. These procedures are the pretreatment by heating of the support (optional but normally preferred), the dispersing of the chromium chelate on the support and the activation of the supported catalyst by heating in a non-oxidizing atmosphere.

PRETREATMENT OF THE SUPPORT

The purpose of pretreatment is to adjust the moisture content of the support. The pretreatment may be carried out in a fluidized bed with any dry non-reactive gas such as air or nitrogen. Alternately, the pretreatment may be carried out in a stationary bed such as in a muffle furnace. Pretreatment in the fluidized bed is preferably to the calcination in the muffle furnace especially if temperatures are above 800°F. The optimum pretreatment temperature is dependent on the support type and its physical properties and may range from 400°F. to 2000°F. Effects of residual moisture or other volatiles on the course of activation are not yet fully understood.

DISPERSION OF THE CHROMIUM CHELATE ON THE SUPPORT

The dispersion of the chromium chelate of this invention on the support can be readily accomplished by a conventional impregnation method using organic solvents such as toluene or benzene. Equally satisfactory dispersion is often achieved by a more convenient method which calls for dry-blending of the chelate with the support and effecting the final dispersion during the initial stage of activation. If such a dry-blending technique is used, the subsequent activation is best carried out in the fluid bed operation. The optimum chromium content of the catalyst is dependent on the support type, surface area and pore structure. In this invention the support can have a surface area of 100–800 m²/g or greater and pore volume of 0–3.0 cc/g, the chromium level may range from 0.05 to 5% with the preferred level somewhere around 0.1–1.0 weight percent on the dry basis.

ACTIVATION UNDER NON-OXIDIZING ATMOSPHERE

In accordance with this invention the non-oxidizing atmosphere is provided either by inert gas such as nitrogen, helium, argon, etc., by a reducing gas such as carbon monoxide, hydrogen, etc., or by evacuation to a sufficiently high vacuum. In the latter case, it is desirable to permit deliberate leak-in of a small amount of non-oxidizing gas. In all cases, a mixture of non-oxidizing gases may be used, if desired.

When the activation is carried out under non-oxidizing (inert or reducing) gas atmosphere, either fluid-bed or stationary-bed operations may be used. Our experience, however, shows that fluid-bed operation is preferable. Normally, for economic reasons, flowing nitrogen is used to fluidize the catalyst in an activator. The temperature is raised to the final activation temperature according to a preselected cycle which normally calls for a 1 to 3 hour hold at 300°–350°F. and again at 550°–600°F. When chromium acetylacetonate is used in the preparation of the catalyst, these two temperature ranges appear to correspond to the completion of two stages of interaction between the chromium acetylacetonate and the support. However, it is possible to obtain active catalysts using other activation temperature programs.

The final activation temperatures may range from about 850°F. to 2000°F. depending on such factors as desired resin properties, support type, pretreatment, etc. In the case of silica-supported chromium acetylacetonate catalyst, the activation temperatures are preferably between 1400° and 1750°F. The heat-up rate above 600°F. is generally not critical.

Novel catalysts of this invention may be used in liquidphase, solution or slurry processes or vapor-phase processes. In the liquid-phase operation any $C_3$–$C_{12}$ saturated hydrocarbon may be used as a reaction medium or diluent. Other types of solvents, including aromatic hydrocarbons and chlorinated solvents, may also be used. The polymerization of the 1-olefins may be carried out in batch or continuous process. The catalyst is generally charged into the reactor as a slurry in the continuous process, but as dry powder in the batch process. The mode of charging the solvent and olefin to the reactor system may follow any conventional practice applicable to batch or continuous operation, respectively. A vigorous agitation of the reaction medium is of course greatly preferred and so is the provision for efficient cooling to control the reactor temperature.

The olefin polymer or copolymer is normally recovered by flashing off the solvent or diluent without any intervening steps for removal of the catalyst. The activity of the novel catalysts described in this invention is normally high enough so that catalyst removal steps can be omitted for all practical purposes. In the case of ethylene, pressures may range from atmospheric to 30,000 psig and temperatures from 150° to 500°F.

The following examples illustrate the invention:

Comments on Examples 1 thru 10 covering Laboratory Batch Polymerization Work

These examples are presented primarily to illustrate various aspects of preparation of the new catalysts and their use in polymerizing olefins.

In order to provide an overall view of these examples, the objectives of each example and certain features of catalyst preparation are summarized as follows:

Example 1 illustrates a relatively simple case of catalyst preparation in which silica is used as received without pretreatment prior to the impregnation with chromium acetylacetonate.

Example 2 illustrates a variation of Example 1 in which silica of higher surface area (600 m²/g vs. 350 m²/g) is precalcined prior to the impregnation with chromium acetylacetonate. Another feature of this catalyst is a relatively high chromium level (nominally, 3% on the dry basis as compared to a typical 1%).

Examples 3 and 4 illustrate the use of support other than silica. Specifically, titania is used in Example 3 and silicaalumina containing 11–14% $Al_2O_3$ is used in Example 4.

Example 5 illustrates the use of chromium benzoylacetonate which is an aryl variation of chromium acetylacetonate.

Example 6 illustrates the use of helium instead of nitrogen during activation.

Example 7 illustrates the activation in a reducing gas, namely a mixture of carbon monoxide and nitrogen, and also the use of high pore volume silica as support.

Example 8 illustrates the activation in a mixture of hydrogen and nitrogen.

Example 9 illustrates the activation at a relatively low temperature level (1000°F. as compared to more typical 1600°–1700°F.).

Example 10 illustrates the use of the catalyst to produce polymer from propylene.

Catalyst Testing Procedure Applicable to Examples 1 thru 9

The ethylene polymerization activity of a given catalyst was tested in a bench-scale reactor using isobutane as the reaction medium. The reactor, essentially an autoclave 5 inches I.D. and about 12 inches deep, was equipped with an agitator rotating at 560 rpm, a flush bottom valve, and three ports for charging catalyst, isobutane and ethylene, respectively. The reactor temperature was controlled by a jacket containing methanol which was kept boiling by an electrical heater encircling the jacket. The control mechanism involved the automatic adjustment of jacket pressures in response to either cooling or heating requirement.

In accordance with a general test procedure, the reactor was first thoroughly purged with ethylene at temperatures around 200°F., followed by the transfer of 0.05–0.5 grams catalyst from a catalyst flask under nitrogen into the reactor via a transfer tube without exposing it to air. After the catalyst charge port was closed, 2900 ml isobutane (dried and de-oxygenated) was charged into the reactor, trapped ethylene was vented, and the reactor was allowed to warm up to 225°F. The reactor was then pressurized with ethylene which was regulated at 550 psig and which was permitted to flow into the reactor whenever the reactor pressure dropped below 550 psig. An instantaneous flow rate of ethylene was monitored by rotameters of various capacity. The duration of a test run was normally from 40 minutes to 4 hours depending on the polymerization rate or desired productivity.

At the end of a test run, ethylene flow was cut off, the flush bottom valve was opened, and the reactor content was dumped into a recovery pot, approximately 5 inches I.D. and 10 inches deep, where isobutane was allowed to flash off through a 200 mesh screen into a vent. Polymer particles left in the pot were recovered and weighed.

EXAMPLE 1

A catalyst was prepared by the following steps:

1. 30.0 grams Davison MS-ID silica gel, having about 350 m$^2$/g surface area and 1.70 cc/g total pore volume, was impregnated with organic solution prepared by dissolving 3.91 grams chromium acetylacetonate in 100 ml benzene.

2. Solvent was evaporated at 85°–140°F. by nitrogen sweep until the catalyst became free flowing. This step always followed the impregnation whenever an organic solvent was used and its mentioning will be omitted in the subsequent examples for simplicity.

3. About 20 grams of this catalyst was then charged into a catalyst activator consisting of a 38mm O.D., 27 inch long Vycor glass tube and tubular electrical heater. A fritted disc was provided in the midsection of the tube for the purpose of fluidizing the catalyst. In this particular example, the fluid bed was maintained by approximately 400 cc/min. nitrogen flow and the catalyst was activated by a heating cycle as follows: (a) hold at 250°F. for ½ hour, (b) hold at 350°F. for 1 hour, (c) hold at 550°F. for 1 hour, (d) raise 100°F. every 15 minutes up to 1600°F., (e) hold at 1600°F. for 2 hours, and (f) cool down to room temperature under nitrogen atmosphere.

4. The activated catalyst was transferred into a closed flask equipped with a hose-and-clamp at both openings without exposing it to air. This step was also applicable to all subsequent examples and its mentioning will be omitted hereafter for simplicity.

Now in accordance with the general test procedure described earlier, 0.1683 gram of catalyst was charged into the reactor. The duration of the run was 120 minutes including about two minutes of induction period. Polymer recovered weighed 175.4 grams and the melt index (ASTM D-1238-62T) of the polymer powder was 0.28 g/10 min.

EXAMPLE 2

A catalyst was prepared by the following steps:

1. About 400 grams Davison 951 MS silica, having about 600 m$^2$/g surface area and 1.00 cc/g total pore volume, was calcined in a muffle furnace by a heating cycle consisting of (a) hold at 400°F. for 1 hour, (b) raising 120°F. every 15 minutes up to 1200°F., (c) hold at 1200°F. for 4 hours, and (d) cool down to room temperature.

2. 30 grams of this calcined silica base was impregnated with organic solution prepared by dissolving 6.30 grams chromium acetylacetonate in 100 ml toluene.

3. The impregnated and partially dried catalyst was activated in nitrogen atmosphere as in Example 1 except a heating cycle consisted of (a) hold at 250°F. for ½ hour, (b) hold at 350°F. for 1 hour, (c) hold at 550°F. for 1 hour, (d) raising 150°F. every 15 minutes up to 1650°F., (e) hold at 1650°F. for 3 hours, and (f) cool down to room temperature.

As in Example 1, 0.5269 gram of this activated catalyst was tested in accordance with the general testing procedure. The duration of the run was 60 minutes including 2 minutes of induction. Polymer recovered weighed 130.0 grams.

EXAMPLE 3

A catalyst was prepared by the following steps:

1. 30 grams of microspheroidal titania, having 112 m$^2$/g surface area, 0.85 cc/g total pore volume, and 65 micron average particle size, was impregnated with organic solution prepared by dissolving 1.935 grams chromium acetylacetonate in 80 ml toluene.

2. The impregnated and partially dried catalyst was activated in the apparatus described in Example 1 using nitrogen for fluidizing the catalyst bed. A heating cycle consisted of (a) hold at 250°F. for 1 hour, (b) hold at 350°F. for 1 hour, (c) hold at 550°F. for 1 hour, (d) raising 100°F. every 15 minutes up to 1200°F., (e) hold at 1200°F. for 3 hours, and (f) cool down to room temperature under nitrogen atmosphere.

For the activity test, 0.1285 gram of catalyst was charged into the reactor. The test run was terminated after 60 minutes including 8 minutes of induction. There was recovered 5.0 grams polymer.

EXAMPLE 4

A catalyst was prepared by the following steps:

1. 50 grams of Davison's silica-alumina containing 11–14% Al$_2$O$_3$ was impregnated with organic solution prepared by dissolving 2.845 grams chromium acetylacetonate in 100 ml toluene.

2. This impregnated and partially dried catalyst was activated in nitrogen as in Example 1, including a final temperature hold at 1600°F. for 2 hours.

The catalyst thus prepared was tested in accordance with the general procedure described earlier. A net charge of catalyst was 0.2889 gram and the run was terminated about 60 minutes including 6 minutes of induction. 7.5 grams of polymer was recovered.

EXAMPLE 5

The catalyst was prepared by the following steps:

1. Davison 952 MS-ID silica was dried in the pilot plant scale activator at 1300°F. for 5 hours as in Example 11.

2. 20.0 grams of this predried silica was impregnated with organic solution containing 2.1 grams chromium benzoylacetonate dissolved in 90 ml toluene.

3. About 15 grams of this impregnated and partially dried catalyst was activated in nitrogen. The activation cycle consisted of (a) hold at 250°F. for 1 hour, (b) hold at 350°F. for 1 hour, (c) hold at 550°F. for 1 hour, (d) raising 200°F. every 15 minutes up to 1600°F., (e) hold at 1600°F. for 2 hours, and (f) cool down to room temperature under nitrogen atmosphere.

The catalyst thus prepared was tested in accordance with the general procedure described earlier. A net charge of catalyst was 0.1700 gram and the run was terminated after 60 minutes including 3 minutes of induction. There was recovered 49 grams of polymer and the melt index (ASTM D-1238-62T) of the polymer powder was 0.42 g/10 min.

EXAMPLE 6

A catalyst was prepared by the following steps:

1. Davison 952 MS-ID silica was dried in the pilot plant activator at 1300°F. for 5 hours as in Example 11.

2. 45.0 grams of this predried silica was impregnated with organic solution containing 3.06 grams chromium acetylacetonate dissolved in 160 ml toluene.

3. About 20 grams of this impregnated and partially dried catalyst was activated in helium using the heating cycle of Example 5.

In accordance with the general test procedure, 0.1666 gram of catalyst was charged into the reactor. The duration of the run was 60 minutes including 2 minutes of induction. 100 grams of polymer was recovered. The melt index (ASTM D-1238-62T) of the polymer powder was 0.29 g/10 min.

EXAMPLE 7

A catalyst was prepared by the following steps:

1. 48.0 grams of high-pore volume silica, manufactured by U.S. Industrial Chemical Co. and having 350 m²/g surface area, 2.5 cc/g pore volume, and 150 micron average particle size, was impregnated with an organic solution prepared by dissolving 3.0 grams chromium acetylacetonate in 140 ml. toluene.

2. About 15 grams of this impregnated and partially dried catalyst was activated in a fluid bed maintained by the mixed flow of 400 std. cc/min nitrogen and 40 std. cc/min carbon monoxide. A heating cycle for the activation was the same as in Example 5.

The catalyst thus prepared was tested in accordance with the general procedure described earlier. A net charge of catalyst was 0.1988 gram. The test run was terminated about 60 minutes including 7 minutes of induction. 95.1 grams of polymer was recovered. The melt index (ASTM D-1238-62T) of the polymer powder was 0.45 g/10 min.

EXAMPLE 8

A catalyst was prepared by the following steps:

1. Davison 952 MS-ID silica was dried in the pilot plant scale activator at 1300°F. for 5 hours as in Example 11.

2. 45.0 grams of this predried silica was impregnated with an organic solution containing 3.06 grams chromium acetylacetonate dissolved in 160 ml toluene.

3. About 20 grams of this impregnated and partially dried catalyst was activated as in Example 7 except the fluid bed was maintained by the mixed flow of 400 std. cc/min nitrogen and 16 std. cc/min of hydrogen.

For the activity test 0.2482 gram of catalyst was charged to the reactor. The test run was terminated after 60 minutes. The recovered polymer weighed 21.0 grams.

EXAMPLE 9

A catalyst was prepared by the following steps:

1. 10.25 grams of Davison 952 MS-ID silica was impregnated with an organic solution prepared by dissolving 0.647 gram chromium acetylacetonate in 50 ml toluene.

2. The impregnated and partially dried catalyst (about 23 grams) was activated in nitrogen as in Example 1 except the heating cycle was as follows: (a) hold at 200°F. for 1 hour, (b) hold at 250°F. for ½ hour, (c) hold at 300°F. for 1 hour, (d) raise 100°F. every 15 minutes up to 1000°F. and (e) hold at 1000°F. for 2 hours.

In accordance with the general test procedure described earlier, 0.3076 gram of catalyst was charged into the reactor. The run was terminated after 160 minutes including five minutes of induction. 190.0 grams of polymer was recovered.

EXAMPLE 10

This example is to illustrate the use of the new catalyst in the polymerization of propylene. The catalyst was the same as used in Example 1.

The apparatus used for polymerization of propylene was essentially the same as that used for ethylene polymerization except for a method of charging propylene. A 300 cc stainless steel cylinder containing 99 grams propylene was first connected to the reactor while the latter was being purged with ethylene. After 0.1965 gram catalyst and 2500 ml isobutane were successively charged to the reactor in accordance with the general procedure described earlier, the reaction medium was de-gassed carefully to eliminate substantially all entrapped ethylene. The valve of the propylene cylinder was then opened to let propylene flow into the reactor. This transfer of propylene from the cylinder to the reactor was facilitated by heating the propylene cylinder with a wrapped-around heating tape throughout the run. The reactor content comprising catalyst, propylene and isobutane was heated to and maintained at 225°F. with the agitator running at 560 rpm as in the ethylene polymerization. However, the reactor pressure was roughly 375 psig in this case. After 90 minutes, the run was terminated and the reactor content was dumped into the flash pot for polymer recovery. There was recovered 12.4 grams polypropylene.

TABLE I

SUMMARY OF EXAMPLES 1 THRU 10
BATCH REACTOR DATA

Reactor Conditions: 225°F., 550 psig, 2900 ml Isobutane Charged

| Example | (1) Nominal Catalyst Composition | (2) Pretreatment of Base °F/Hr (Atmos) | (3) Act. Temp. °F/Hr (Atmos) | (4) Reactivity on Total Cat. g/g/hr | (5) Polymer Made g/g Cat. | (6) Powder Melt Index g/10 min* |
|---|---|---|---|---|---|---|
| 1 | 2% Cr/952 SiO₂ | None | 1600/2 (N₂) | 521 | 1042 | 0.28 |
| 2 | 3% Cr/951 SiO₂ | 1200/3 (Air) | 1650/3 (N₂) | 247 | 247 | — |
| 3 | 1% Cr/TiO₂ | None | 1200/3 (N₂) | 39 | 39 | — |
| 4 | 1% Cr/SiO₂—Al₂O₃ | None | 1600/2 (N₂) | 26 | 26 | — |
| 5 | 1% Cr/952 SiO₂ | 1300/5 (N₂) | 1600/2 (N₂) | 288 | 288 | 0.42 |
| 6 | 1% Cr/952 SiO₂ | 1300/5 (N₂) | 1600/2 (He) | 603 | 603 | 0.29 |
| 7 | 1% Cr/High Pore Vol. SiO₂ | None | 1600/2 (CO) (N₂) | 478 | 478 | 0.45 |
| 8 | 1% Cr/952 SiO₂ | 1300/5 (N₂) | 1600/2 (H₂) (N₂) | 84 | 84 | — |
| 9 | 1% Cr/952 SiO₂ | None | 1000/2 (N₂) | 235 | 618 | — |

TABLE I-continued

SUMMARY OF EXAMPLES 1 THRU 10
BATCH REACTOR DATA

Reactor Conditions: 225°F., 550 psig, 2900 ml Isobutane Charged

| Example | (1) Nominal Catalyst Composition | (2) Pretreatment of Base °F/Hr (Atmos) | (3) Act. Temp. °F/Hr (Atmos) | (4) Reactivity on Total Cat. g/g/hr | (5) Polymer Made g/g Cat. | (6) Powder Melt Index g/10 min* |
|---|---|---|---|---|---|---|
| 10 | 2% Cr/952 SiO$_2$ | None | 1600/2 (N$_2$) | 42 | 63 | — |

*ASTM D-1238-62T

In the above Table column (1) indicates the concentration by weight of the catalyst in percentage of chromium and also designates the particular carrier employed. Thus in Example 4 the carrier is a mixture of silicon dioxide and aluminum trioxide.

In column (2) the pretreatment, where used, of the carrier or base is identified by temperature, time and the nature of the surrounding atmosphere.

Column (3) is similar to column (2) but expresses the activating conditions for activating the catalyst.

Column (4) gives the reactivity of the catalyst as grams of polymer produced per gram of catalyst per hour.

Column (5) gives the total grams of polymer produced per gram of catalyst.

Column (6) lists the melt index of the resulting polymer which in each instance is in powder form.

The following examples illustrate procedures and preparations on a pilot plant scale.

EXAMPLE 11

A silica base having a surface area approximately 350 m$^2$/g and a pore volume of approximately 1.7 cc/gm was used as the catalyst support for this example.

This type of material is available commercially from the Davison Chemical Company and their designation for this type of material if 952 MS-ID silica gel. The catalyst of this example was prepared by taking this silica base and first drying it at 1300°F. in a fluidized bed using nitrogen as the fluidizing gas. The apparatus used for this drying step consisted of a 4 inches I.D. by about 48 inches long tube made of Inconel metal. The tube was provided with electric heaters around the outside of the tube. The heaters were capable of heating the tube plus its contents to temperatures up to 2000°F. The bottom of the tube was fitted with a distributor plate designed to give uniform distribution of the gas entering the bottom of the tube and flowing up through the tube. A bed of regenerated molecular sieves was used to dry the nitrogen to a total moisture content of less than 2 ppm (vol) before it entered the tube. A flow measuring device to regulate the flow rate of gas through the activator tube was provided. A controller for the heating elements capable of raising the temperature of the fluidizing tube to elevated temperatures according to a predetermined cycle was also provided.

After drying at 1300°F., the base was cooled to near ambient temperature while still being fluidized with nitrogen. The dried silica was then removed from the tube with precaution being taken to prevent moisture pick-up from the atmosphere. This dried silica was then impregnated with a sufficient amount of a solution of chromium acetylacetonate in dried toluene to give a chromium concentration of 1% by weight on the total dry catalyst. The catalyst was then placed in an oven and the toluene removed by heating at about 150°–200°F. in the presence of a dry nitrogen atmosphere. Once the bulk of the toluene was removed, the dried catalyst was transferred to the fluidizing tube described above.

In this tube, the catalyst was fluidized with nitrogen and heated to a temperature of 350°F. and held for 3 hours, the temperature was then raised to 550°F. and held for 3 hours, and the temperature was then raised to 1650°F. and held for 6 hours. The heat up rate between hold temperatures was about 150°F. per hour. All the while the nitrogen flow was held constant to provide fluidization of the catalyst within the heated tube. The catalyst was then cooled to approximately ambient temperature while still fluidized and was then dumped from the tube into a predried flask which had been carefully purged to eliminate all traces of oxygen and moisture from the interior of the flask. This flask was then sealed, and the flask was stored in a container having a dry nitrogen environment until the catalyst was to be used in the polymerization system. The activated catalyst of this example was black in color. At a suitable time, the catalyst was charged to a continuous polymerization reactor and used to polymerize ethylene at a temperature of about 227°F. in the presence of dry isobutane and with an ethylene concentration of about 5% by weight in the reactor.

The reactor used for the continuous polymerization tests consisted of a vessel provided with a jacket and a means for good agitation within the vessel. The volume of the vessel was about 90 gallons. Water was circulated through the jacket of the reactor to remove the heat liberated during the polymerization reaction. Means were provided to regulate the coolant temperature and the coolant flow so as to control the temperature of the reactor. Means were provided for feeding a slurry of catalyst to the reactor at a controlled rate. Means were also provided to feed ethylene to the reactor at a controlled rate. Means were provided for introducing a second monomer or comonomer to the reactor as well as modifying agents to control the molecular weight of the polymer formed in the reactor although these were not used in this example. Means were provided to feed a diluent separately to the reactor at a controlled rate. Means were provided to discharge a mixture of the polymer formed in the reactor, unreacted monomer and/or comonomer, and diluent from the reactor. The polymer mixture discharged from the reactor flowed to a heated flash vessel where the diluent and unreacted ethylene were removed as a vapor and the polymer was recovered with only traces of hydrocarbon. The recovered polymer was purged batchwise with inert gas to remove the traces of hydrocarbon and analyzed for melt index, density and ash.

These factors are determined by standard tests well known in the industry. The test used for determining melt index is ASTM D-1238-62T, and the method for measuring the density is given as ASTM D-1505. Ash was determined by a pyrolysis method. In all cases, the polymer yield figures are calculated from the ash values.

The polymer of this example had a melt index of 0.2 and a density greater than 0.960. The yield of catalyst on polymer amounted to 3200 pounds of polymer collected per pound of catalyst fed to the reactor. This data along with the data from the following examples is summarized in Table II. In all examples, isobutane was used as the diluent in the reactor system.

A sample of the catalyst used in this example was analyzed for $Cr^{+6}$ by leaching the catalyst with hot water and determining the chromium dissolved in the water by adding potassium iodide and then titrating with sodium thiosulfate. The water used to leach the catalyst was clear and colorless and no $Cr^{+6}$ was found by titration.

EXAMPLE 12

The catalyst for this example was prepared in the same manner as that used in Example 11 except that the chromium acetylacetonate was added to the predried base as a dry powder, and the base and Cr(AcAc)$_3$ were dry mixed prior to charging to the fluidizing tube. The activated catalyst was black in color. This catalyst was tested in the continuous polymerization reactor of Example 11. The catalyst was active as shown by the data in Table II. This example shows that active catalysts can be made by dry mixing the chromium acetylacetonate and the silica base compared to solution impregnation of the dry base.

EXAMPLE 13

This example shows the effect of not predrying the catalyst support during catalyst preparation. The catalyst used in this example was prepared in the same manner as the catalyst in Example 12 except that the silica base was not predried prior to mixing the base with the dry chromium acetylacetonate. The results obtained with the catalyst when tested in the continuous polymerization reactor of Example 11 are shown in Table II. Analysis of the catalyst of this example for $Cr^{+6}$ by the method of Example 11 shows this catalyst to contain less than 0.01 weight percent of $Cr^{+6}$.

EXAMPLE 14

The catalyst in this example was prepared in an identical manner with the catalyst of Example 11 except that the silica base used to prepare the catalyst was Davison 951 MS silica gel having an approximate pore volume of 1 cc/gm and a surface area of approximately 600 m$^2$/gm. The results obtained with this catalyst in the continuous polymerization reactor are shown in Table II. This example demonstrates that supports with a wide variety of surface area and pore volume can be used to prepare the catalysts of this invention. A sample of this catalyst was analyzed for $Cr^{+6}$ by the method of Example 11. The analysis showed no $Cr^{+6}$ by titration.

EXAMPLE 15

This example demonstrates the use of the catalyst of this invention to make a copolymer of ethylene and hexene-1. The catalyst of this example was prepared in the same manner as in Example 12. The catalyst was fed to the continuous polymerization unit along with hexene-1 and ethylene. The ratio of hexene-1 to ethylene in the reactor feed was 0.48 lbs/100 lbs. The results of the run are shown in Table II.

EXAMPLE 16

This example demonstrates the use of the catalyst of this invention to produce a copolymer of ethylene and butene-1. The catalyst of this example was prepared in the same manner as in Example 12. The catalyst was fed to the polymerization reactor along with ethylene and butene-1. The ratio of butene-1 to ethylene in the reactor feed was 0.42 lbs/100 lbs. The results of this run are shown in Table II.

EXAMPLE 17

This example demonstrates the effect of using hydrogen during the polymerization reaction to increase the melt index of the polymer. A catalyst was prepared in the same manner as Example 11. This catalyst was used in the continuous polymerization reactor. In addition to ethylene, solvent and catalyst, hydrogen which was deoxidized and dried was fed continuously to the reactor. The rate of hydrogen addition was equal to 0.007 mol/mol of ethylene fed to the reactor. As shown in Table II, the hydrogen addition resulted in an increased melt index compared to that obtained in Example 11.

EXAMPLE 18

This example compares the catalyst of this invention with a catalyst prepared using Davison 952 MS silica base impregnated with $CrO_3$ and activated in dry nitrogen according to the method of this invention. A catalyst composed of 952 silica impregnated with $CrO_3$ is a Phillips' type catalyst, although according to U.S. Pat. Nos. 2,825,721 and 2,951,816 the preferred procedure in the activation of this type of catalyst is to use an oxidizing atmosphere. The catalyst used in this example was Davison 969 MS catalyst which is a catalyst containing approximately 2% $CrO_3$ by weight on a 952 silica base. This catalyst was activated in the activator described in Example 11 using nitrogen as the fluidizing gas and a maximum activation temperature of 1650°F. This catalyst was then used in the continuous polymerization unit as described in Example 11. This catalyst had essentially no activity. The catalyst was found to contain 0.06% by weight $Cr^{+6}$ by the analytical method described in Example 11.

This example 18 illustrates that the technique of activating a catalyst in an inert gas such as nitrogen results in a catalyst containing little or no $Cr^{+6}$ even when the catalyst prior to activation contains all the chromium in the form of $Cr^{+6}$. This example 18 further illustrates that the catalysts of this invention have superior activity to $CrO_3/SiO_2$ type catalysts when activated according to the method of this invention.

TABLE II

| Example | Nominal Cat. Composition | Base Pretreatment °F. (1) | Continuous Reactor Runs Activation Temperature °F. (1) | Reactor Temp. | Melt Index g/10 min. | Density g/cc | Cat. Productivity lb Polymer/lb Cat |
|---|---|---|---|---|---|---|---|
| 11 | 1% Cr/952 SiO$_2$ (Tol. Soln. Imp.) | 1300 | 1650 | 227 | 0.20 | .96+ | 3200 |
| 12 | 1% Cr/952 SiO$_2$ (Dry Mixed) | 1300 | 1650 | 226 | 0.27 | .96+ | 2630 |
| 13 | 1% Cr/952 SiO$_2$ (Dry Mixed) | None | 1650 | 227 | 0.22 | .96+ | 1500 |
| 14 | 1% Cr/951 SiO$_2$ (Tol. Soln. Imp.) | 1300 | 1650 | 228 | 0.05 | .96+ | 1850 |
| 15 | 1% Cr/952 SiO$_2$ (Dry Mixed) | 1300 | 1650 | 222 | 0.27 | .955 | 2900 |
| 16 | 1% Cr/952 SiO$_2$ (Dry Mixed) | 1300 | 1650 | 222 | 0.22 | .953 | 3050 |
| 17 | 1% Cr/952 SiO$_2$ (Tol. Soln. Imp.) | 1300 | 1650 | 227 | 0.47 | .96+ | 1750 |
| 18 | 1% Cr/952 SiO$_2$ (CrO$_3$/SiO$_2$ Cat.) | None | 1650 | 227 | — | — | Nil |

(1) Pretreatment and activation in nitrogen.
Tol. = toluene
Cat. = catalyst

We claim:

1. A catalyst prepared by dispersing on a finely divided, difficultly reducible, inorganic support of the class consisting of silica, alumina, thoria, zirconia, titania, magnesia and mixtures and composites thereof a chromium chelate of a beta-dicarbonyl compound essentially of the formula of the class consisting of $$\left[ R-\underset{\underset{O}{\|}}{C}-CH-\underset{\underset{O}{\|}}{C}-R \right]_m CrX_n,$$

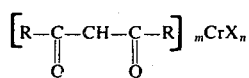

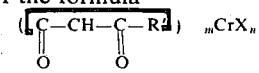

wherein each R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, m is a whole number from 1 to 3, n is a whole number from 0 to 2 with m plus n being a whole number of 2 to 3 and X is a negative group, relative to chromium and activating the resulting mixture by heating to and at an elevated temperature of from about 850°–2000°F. in a non-oxidizing atmosphere.

2. The catalyst of claim 1 wherein said chelate is essentially of the formula $$\left[ R-\underset{\underset{O}{\|}}{C}-CH-\underset{\underset{O}{\|}}{C}-R \right]_m CrX_n$$

3. The catalyst of claim 1 wherein said chelate is essentially of the formula

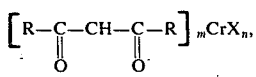

4. The catalyst of claim 1 wherein said chelate is essentially of the formula

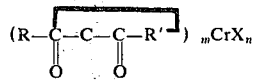

5. The catalyst of claim 1 wherein said support prior to the addition of said chromium chelate is pretreated by heating at a temperature of from about 400°–2000°F. until volatile matter is at least partially driven off.

6. The catalyst of claim 1 wherein said chromium chelate is dissolved in a solvent and the resulting solution used to impregnate the support.

7. The catalyst of claim 1 wherein said dispersing of said chromium chelate is accomplished by dry blending with the finely divided support and activating by heating in a fluid bed maintained in suspension with a non-oxidizing gas flowing through the support during the heating.

8. The catalyst of claim 1 wherein said activating is in a fluid bed using a non-oxidizing gas to maintain the mixture of support and chromium chelate in a fluid condition while heating to said final activation temperature.

9. The catalyst of claim 1 wherein said chromium chelate is chromium 2,4-hexanedionate which is the chromium derivative of 2,4-hexanedione.

10. The catalyst of claim 1 wherein said chromium chelate is chromium acetylacetonate which is the chromium derivative of 2,4-pentanedione.

11. The catalyst of claim 1 wherein said chromium chelate is chromium benzoylacetonate which is the chromium derivative of 1-phenyl-1,3-butanedione.

12. The catalyst of claim 1 wherein said chromium chelate is chromium 5,5-dimethyl-1,3-cyclohexanedionate which is the chromium derivative of 5,5-dimethyl-1,3-cyclohexanedione.

13. The catalyst of claim 1 wherein said chromium chelate is chromium 2-acetylcyclohexanonate which is the chromium derivative of 2-acetylcyclohexanone.

14. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 1.

15. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 5.

16. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 6.

17. The method of making polymers of 1-olefins of 2 to 8 carbon atoms and copolymers of said olefins and 1-olefins of 1 to 20 carbon atoms which comprises polymerizing said olefins under polymerizing conditions with the catalyst of claim 7.

18. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 8.

19. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 9.

20. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 10.

21. The method of making polymers of 1-olefins of 2 to 8 carbon atoms and copolymers of said olefins and 1-olefins of 2 to 20 carbon atoms which comprises polymerizing said olefins under polymerizing conditions with the catalyst of claim 11.

22. The process of preparing an active polymerization catalyst comprising the steps of initially mixing with a finely divided, difficultly reducible, inorganic support of the class consisting of silica, alumina, thoria, zirconia, titania, magnesia and mixtures and composites thereof a chromium chelate of a beta-dicarbonyl compound essentially of the formula of the class consisting of

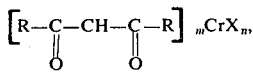

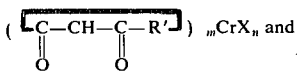 and

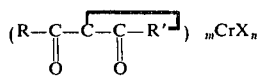

wherein each R is individually selected from hydrogen, alkyl, alkenyl, aryl, cycloalkyl and cycloalkenyl radicals and combinations of these radicals with each R containing 0 to 20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1 to 20 carbon atoms and a corresponding valence-satisfying number of hydrogen atoms, $m$ is a whole number from 1 to 3, $n$ is a whole number from 0 to 2 with $m$ plus $n$ being a whole number of 2 to 3 and X is a negative group relative to chromium, and activating the resulting mixture by heating to and at an elevated temperature of from about 850°–2000°F. in a non-oxidizing atmosphere.

23. The process of claim 22 wherein said chelate is essentially of the formula

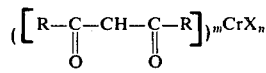

24. The process of claim 22 wherein said chelate is essentially of the formula

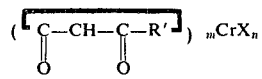

25. The process of claim 22 wherein said chelate is essentially of the formula

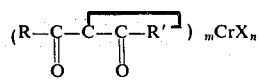

26. The process of claim 22 wherein said support prior to the addition of said chromium chelate is pretreated by heating at a temperature of from about 400°–2000°F. until volatile matter is at least partially driven off.

27. The process of claim 22 wherein said chromium chelate is dissolved in a solvent and the resulting solution used to impregnate the support.

28. The process of claim 22 wherein said mixing is accomplished by dry blending the chromium chelate with the finely divided support.

29. The process of claim 22 wherein said activating is in a fluid bed maintained by the flow of a non-oxidizing gas.

30. The process of claim 29 wherein said non-oxidizing gas is selected from the class consisting of nitrogen, hydrogen, carbon monoxide, noble gases and mixtures of these gases.

31. The process of claim 22 wherein said activating is in a stationary bed in a non-oxidizing atmosphere provided by evacuation of air from said bed.

32. The process of claim 22 wherein said activating is in a stationary bed in a non-oxidizing atmosphere provided by a non-oxidizing gas.

33. The process of claim 32 wherein said non-oxidizing gas is selected from the class consisting of nitrogen, hydrogen, carbon monoxide, noble gases and mixtures of these gases.

34. The process of claim 22 wherein said activating is in a fluid bed using a non-oxidizing gas to maintain the mixture of support and chromium chelate in suspension while heating to and at said final activation temperature.

35. The process of claim 34 wherein said non-oxidizing gas is selected from the class consisting of nitrogen, hydrogen, carbon monoxide, noble gases and mixtures of these gases.

36. The process of claim 22 wherein said activating is in a fluid bed using a non-oxidizing gas to maintain the mixture of support and chromium chelate in a fluid condition while heating at activating temperatures of about 300°–350°F. for from about 1 to 3 hours and then for about a further 1 to 3 hours at about 550°–600°F. to produce an interaction between the chromium compound and the support, followed by final activation to and at said temperature of about 850°–2000°F.

* * * * *